(12) United States Patent
Bellinger

(10) Patent No.: US 6,349,253 B1
(45) Date of Patent: Feb. 19, 2002

(54) SYSTEM AND METHOD FOR CONTROLLING DOWNHILL VEHICLE OPERATION

(75) Inventor: Steven M. Bellinger, Columbus, IN (US)

(73) Assignee: Cummins Engine, Inc., Columbus, IN (US)

( * ) Notice: Subject to any disclaimer, the term of this patent is extended or adjusted under 35 U.S.C. 154(b) by 0 days.

(21) Appl. No.: 09/192,009

(22) Filed: Nov. 13, 1998

(51) Int. Cl.[7] .................. G06F 17/00; G06F 19/00; H02P 15/00; B60K 41/20
(52) U.S. Cl. ..................... 701/53; 701/54; 701/61; 701/83; 701/86; 701/93; 701/94; 701/95; 477/27; 477/32; 477/40; 477/94; 477/115; 477/118
(58) Field of Search .................. 701/53, 54, 61, 701/64, 83, 86, 93, 94, 95, 97, 99, 100, 101, 112; 477/24, 27, 32, 40, 94, 115, 118, 183, 185

(56) References Cited

U.S. PATENT DOCUMENTS

| | | | |
|---|---|---|---|
| 3,882,973 A | | 5/1975 | Hakes |
| 3,931,870 A | | 1/1976 | Memmer |
| 4,485,444 A | | 11/1984 | Maruyama et al. |
| 4,648,291 A | | 3/1987 | Klatt et al. |
| 4,713,764 A | | 12/1987 | Klatt |
| 4,884,669 A | | 12/1989 | Ehrlinger |
| 4,942,784 A | | 7/1990 | Okahara |
| 5,231,897 A | | 8/1993 | Morita |
| 5,337,245 A | * | 8/1994 | Matsuzaki ............... 701/208 |
| 5,483,927 A | | 1/1996 | Letang et al. |
| 5,485,161 A | * | 1/1996 | Vaughn ................... 342/357 |
| 5,485,381 A | * | 1/1996 | Heintz et al. ............. 701/93 |
| 5,564,999 A | * | 10/1996 | Bellinger et al. ......... 477/111 |
| 5,598,335 A | | 1/1997 | You |
| 5,605,044 A | * | 2/1997 | Zimmer et al. ............ 60/602 |
| 5,703,776 A | | 12/1997 | Soung |
| 5,738,606 A | * | 4/1998 | Bellinger ................. 477/111 |
| 5,893,894 A | * | 4/1999 | Moroto et al. ............ 701/53 |
| 5,995,895 A | * | 11/1999 | Watt et al. ................ 701/50 |
| 6,016,795 A | * | 1/2000 | Ohki ......................... 123/681 |
| 6,021,370 A | * | 2/2000 | Bellinger et al. ......... 701/110 |
| 6,062,025 A | * | 5/2000 | Okada et al. .............. 60/602 |
| 6,182,000 B1 | * | 1/2001 | Ohta et al. ................ 701/55 |

OTHER PUBLICATIONS

Kevin Jost, "SAE and intelligent vehicles," Automotive Engineering International, (Oct. 25, 1998).

* cited by examiner

Primary Examiner—Jacques H. Louis-Jacques
Assistant Examiner—Brian J. Broadhead
(74) Attorney, Agent, or Firm—Barnes & Thornburg

(57) ABSTRACT

A system for controlling downhill vehicle operation includes an electronically actuatable engine compression brake unit associated with an internal combustion engine, an electronically controllable turbocharger boost pressure adjustment device, electronically actuatable service brakes and a transmission including a number of automatically selectable gear ratios, wherein each of these components are coupled to a control computer. In accordance with one aspect of the present invention, the control computer is operable to detect a potential runaway vehicle condition and control any one or combination of engine compression brake activity, turbocharger boost pressure, service brake activity and automatic transmission shifting to thereby provide for a controlled descent down a negative grade and thereby prevent a runaway vehicle condition. In accordance with another aspect of the present invention, the control computer is operable to determine a target engine or vehicle speed and control engine or vehicle speed to the target speed, regardless of whether a potential runaway vehicle condition exists, using any one or more of the foregoing control techniques.

15 Claims, 8 Drawing Sheets

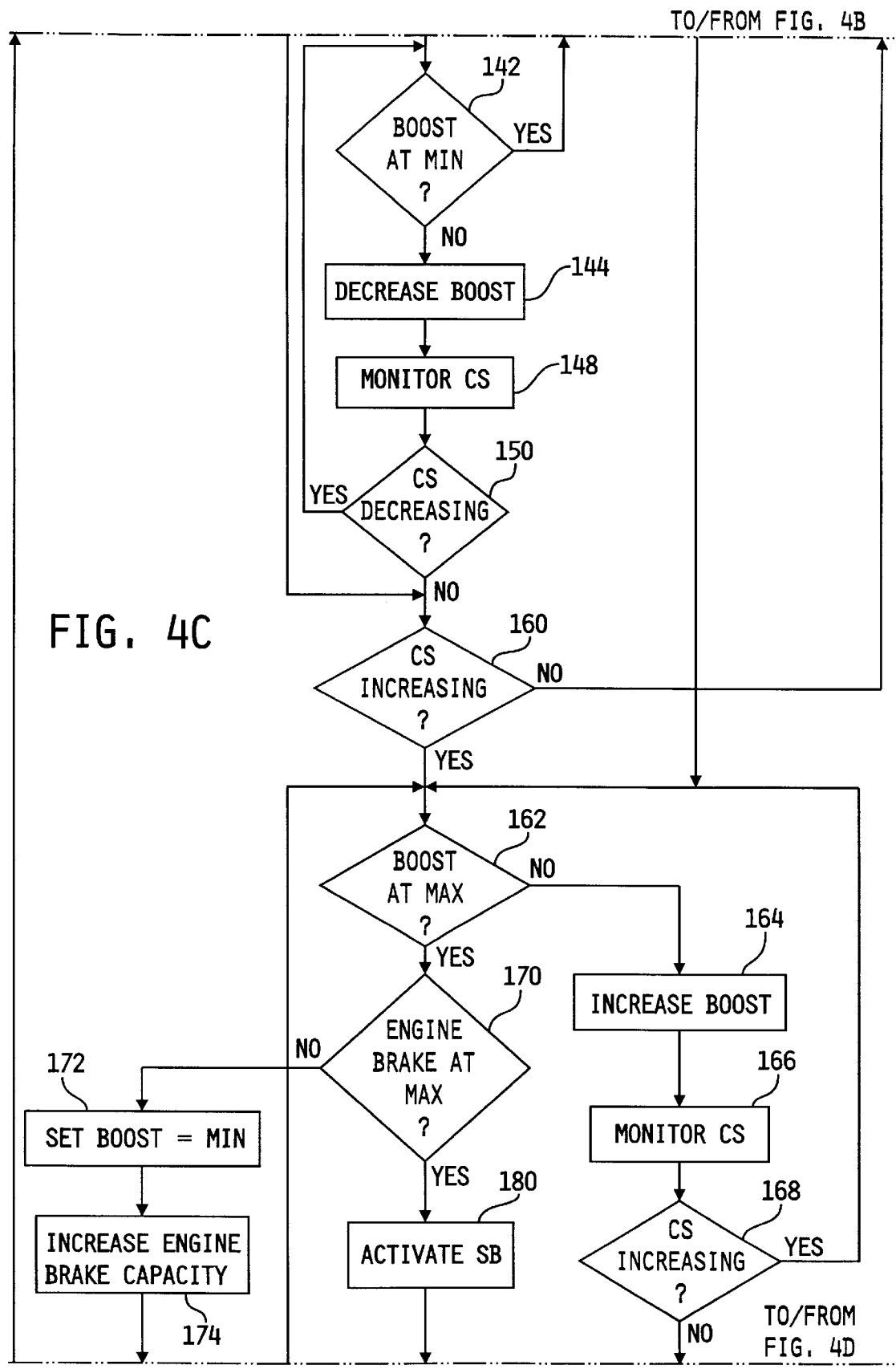

SYSTEM AND METHOD FOR CONTROLLING DOWNHILL VEHICLE OPERATION

FIELD OF THE INVENTION

The present invention relates generally to systems for controlling engine and/or vehicle operation, and more specifically to such systems operable to control engine and/or vehicle operation while descending negative grades.

BACKGROUND OF THE INVENTION

Many modern heavy duty tractor trucks include engine compression brakes operable to apply retarding torque to internal combustion engines carried by the trucks during prescribed operating conditions. Such engine compression brakes are typically used to assist in decreasing engine and/or vehicle speed in addition, or alternatively, to the vehicle service brakes. Engine compression brake technology has been well received and is widely used, particularly in the heavy duty diesel engine industry, and operational details thereof are well known.

When a tractor truck operator encounters a steep downhill or negative grade, known technology typically requires the operator to carefully exercise control over the engine compression brakes, service brakes and downshifting of the vehicle transmission to thereby maintain a controlled descent down the hill. As this term is used herein, "controlled descent" is understood to define a downhill vehicle operating condition wherein engine or vehicle speed is maintained substantially at a target engine or vehicle speed. Such descents, however, are largely a function of the vehicle operator's experience, and a runaway vehicle condition may result when an operator loses control over engine/vehicle speed while descending the grade. Most steep negative grades accordingly include run-off areas that provide a steep uphill vehicle path or other means for maneuvering the vehicle out of harm's way while also providing for increasing engine/vehicle retarding force due to the steep positive incline or other vehicle slowing/stopping means. Concern over runaway vehicle conditions may be heightened as transmissions in heavy duty tractor trucks become more automated since vehicle operators may become increasingly reliant on automated shifts, and hence the capability of manually downshifting to a numerically lower gear may become increasingly overlooked. Currently, no systems are known for automatically controlling engine/vehicle speed to thereby provide for a controlled descent under potential runaway vehicle conditions.

There also exist other conditions where it would be desirable to provide for a controlled descent down a negative grade at an engine/vehicle speed that is different from current engine/vehicle speed conditions. As a specific example, a vehicle operator may crest a steep downhill grade at a first vehicle speed (e.g. 55 mph), and desire to descend the grade at a lesser second vehicle speed (e.g. 40 mph) due to current weather conditions, changing speed limit restrictions or the like. While the vehicle operator may have no trouble in achieving the lesser second vehicle speed via proper control over engine compression brakes, service brakes and/or transmission gear shifting, no systems are currently known for automatically providing for a controlled descent down a negative grade at a selected engine/vehicle speed.

What is therefore needed is a system for automatically controlling engine/vehicle speed to thereby provide for a controlled descent down a negative grade. Such a system should ideally provide for a controlled descent under potential runaway vehicle conditions and further under conditions specified by the vehicle operator to thereby provide for a controlled descent at a desired engine/vehicle speed.

SUMMARY OF THE INVENTION

The foregoing shortcomings of the prior art are addressed by the present invention. In accordance with one aspect of the present invention, a system for controlling downhill vehicle operation, comprises means for determining a potential runaway vehicle condition, an engine compression brake associated with an internal combustion engine for retarding engine operation, a service brake associated with a vehicle carrying the engine, a transmission coupled to the engine and having a number of automatically selectable gear ratios, and a control computer responsive to detection of the potential runaway vehicle condition to control the engine compression brake, the service brake and selection of the number of automatically selectable gear ratios of the transmission to thereby control one of engine and vehicle speed to prevent a runaway vehicle condition.

In accordance with another aspect of the present invention, a method of controlling downhill operation of a vehicle carrying an internal combustion engine having an engine brake and coupled to a transmission having a number of automatically selectable gear ratios, comprises the steps of determining whether a potential runaway condition exists for a vehicle carrying an internal combustion engine coupled to a transmission having a number of automatically selectable gear ratios, and performing the following steps if the potential runaway condition exists; determining one of a current engine and vehicle speed, and controlling any of an engine brake associated with the engine, a service brake associated with the vehicle and selection of the number of automatically selectable gear ratios of the transmission to thereby maintain one of a current engine and vehicle speed at a substantially constant speed value for a duration of the potential runaway condition.

In accordance with yet another aspect of the present invention a system for controlling downhill vehicle operation comprises an engine compression brake associated with an internal combustion engine for retarding engine operation, a service brake associated with a vehicle carrying the engine, a transmission coupled to the engine and having a number of automatically selectable gear ratios, means for determining one of a target engine and vehicle speed, means for determining whether the vehicle is traversing a negative grade, and a control computer responsive to detection of the vehicle traversing a negative grade to control any of the engine compression brake, the service brake and selection of the number of automatically selectable gear ratios of the transmission to thereby control one of engine and vehicle speed to a corresponding one of the target engine speed and the target vehicle speed.

In accordance with a further aspect of the present invention, a method of controlling downhill operation of a vehicle carrying an internal combustion engine having an engine brake and coupled to a transmission having a number of automatically selectable gear ratios, comprises the steps of determining whether the vehicle is traversing a negative grade, determining one of a target engine speed and a target vehicle speed, performing the following steps if the vehicle is traversing a negative grade, determining one of a current engine and vehicle speed, and controlling any of an engine brake associated with the engine, a service brake associated with the vehicle and selection of the number of automatically selectable gear ratios of the transmission to thereby control one of current engine and vehicle speed to a corresponding one of the target engine speed and the target vehicle speed.

In accordance with still another aspect of the present invention, a system for controlling downhill vehicle operation, comprises means for determining a potential runaway vehicle condition, a service brake associated with a vehicle carrying the engine, a transmission coupled to the engine and having a number of automatically selectable gear ratios, and a control computer responsive to detection of the potential runaway vehicle condition to control the service brake and selection of the number of automatically selectable gear ratios of the transmission to thereby control one of engine and vehicle speed to prevent a runaway vehicle condition.

In accordance with still a further aspect of the present invention, a system for controlling downhill vehicle operation, comprises an engine compression brake associated with an internal combustion engine for retarding engine operation, means for determining one of a target engine and vehicle speed, a service brake associated with a vehicle carrying the engine, a transmission coupled to the engine and having a number of automatically selectable gear ratios, and a control computer responsive to determination of the target engine or vehicle speed and to activation of the engine compression brake to control the service brake and selection of the number of automatically selectable gear ratios of the transmission to thereby control one of engine and vehicle speed to the target engine or vehicle speed.

In accordance with yet a further aspect of the present invention, a system for controlling downhill vehicle operation, comprises an engine compression brake associated with an internal combustion engine carried by a vehicle, means for determining a potential runaway vehicle condition, and a control computer responsive to detection of the potential runaway vehicle condition to control the engine compression brake to thereby control one of engine and vehicle speed to prevent a runaway vehicle condition.

In accordance with yet another aspect of the present invention, a system for controlling downhill vehicle operation, comprises an engine compression brake associated with an internal combustion engine for retarding engine operation, means for determining one of a target engine and vehicle speed, and a control computer responsive to determination of the target engine or vehicle speed and to activation of the engine compression brake to control the engine compression brake to thereby control one of engine and vehicle speed to the target engine or vehicle speed.

One object of the present invention is to provide a system and method for controlling downhill vehicle operation by controlling an engine compression brake, vehicle service brakes and/or selection of a number of automatically selectable gear ratios of a transmission coupled to the vehicle engine, to thereby achieve a target engine or vehicle speed and provide for a controlled descent down the hill.

Another object of the present invention is to provide such a system operable to control downhill vehicle operation by further controlling turbocharger boost pressure to thereby achieve the target engine or vehicle speed.

These and other objects of the present invention will become more apparent from the following description of the preferred embodiment.

DESCRIPTION OF THE PREFERRED EMBODIMENTS

Figure 1:
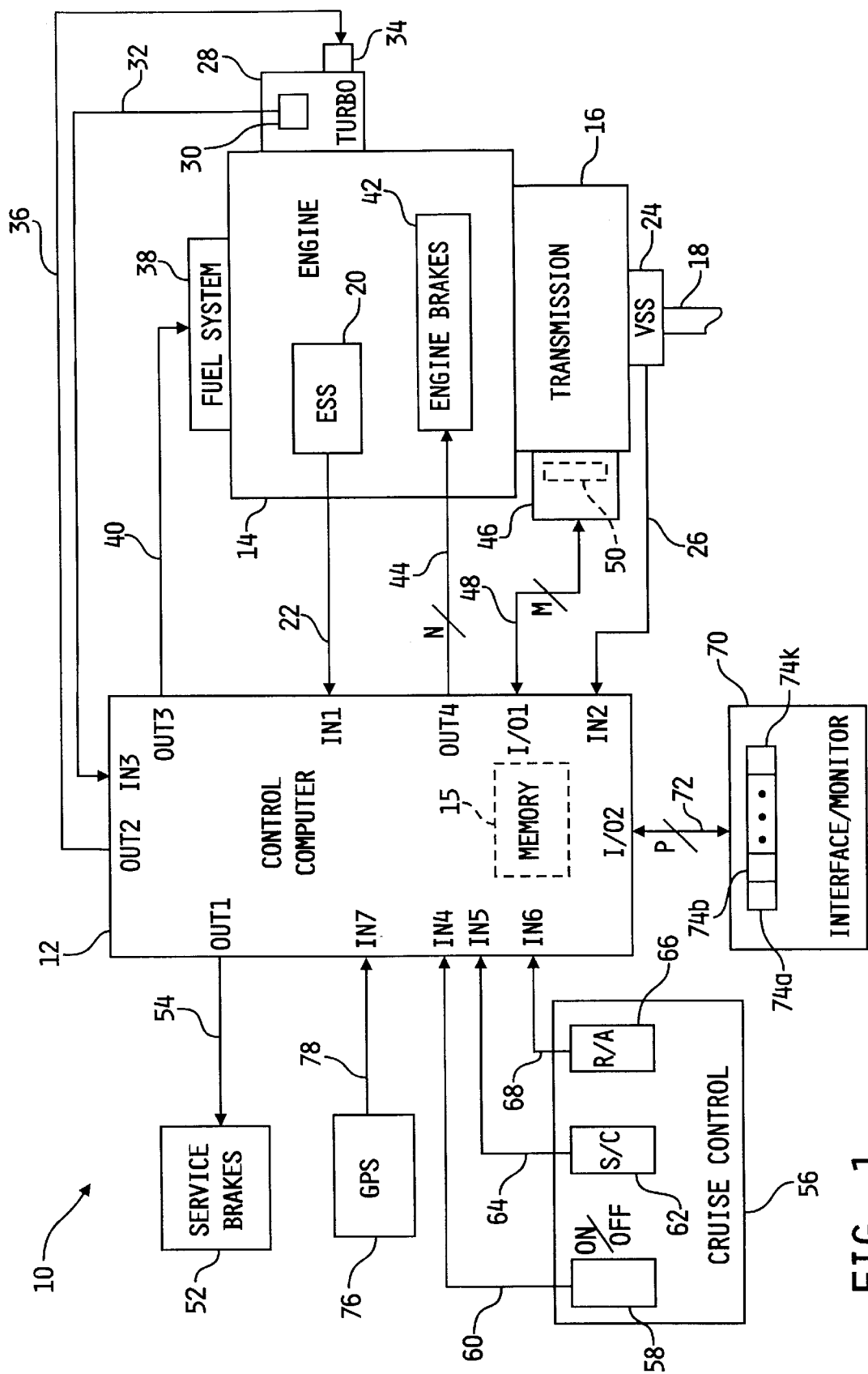
FIG. 1 is a diagrammatic illustration of one preferred embodiment of a system for controlling downhill vehicle operation, in accordance with the present invention.

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Referring now to FIG. 1, one preferred embodiment of a system 10 for controlling downhill vehicle operation, in accordance with the present invention, is shown. Central to system 10 is a control computer 12 which is preferably microprocessor-based and includes a memory portion 15. In one embodiment, control computer 12 is a so-called engine control module (ECM), engine control unit (ECU) or powertrain control module (PCM) typically used in controlling and managing the operation of an internal combustion engine 14. Engine 14 is operatively connected to a transmission 16 which is, in turn, operatively connected to a propeller shaft, or tailshaft, 18, wherein the engine 14 drives tailshaft 18 via any of a number of selectable gear ratios of transmission 16 as is known in the art. As it relates to the present invention, transmission 16 may be a fully automatic or semi-automatic transmission having a number of automatically selectable gear ratios.

System 10 includes a number of sensors and other electronic components operable to provide control computer 12 with operational data related to engine 14 and/or the vehicle carrying engine 14. For example, engine 14 includes an engine speed sensor 20 (ESS) electrically connected to input IN1 of control computer 12 via signal path 22. In one embodiment, ESS 20 is a Hall effect sensor, although the present invention contemplates that sensor 20 may be a variable reluctance or other known sensor or sensing system operable to determine engine rotational speed and provide an engine speed signal corresponding thereto on signal path 22.

System 10 further includes a vehicle speed sensor 24 (VSS) electrically connected to input IN2 of control computer 12 via signal path 26. Preferably, VSS 24 is a variable reluctance sensor disposed about tailshaft 18, wherein sensor 24 is operable to sense tailshaft rotational speed and provide a corresponding vehicle speed signal on signal path 26. It is to be understood, however, that the present invention contemplates that sensor 24 may be any known sensor or sensing system positioned at any suitable location, so long as sensor 24 is operable to provide control computer 12 with a signal from which control computer 12 may determine vehicle speed.

Engine 14 further includes a turbocharger 28 of known construction and operation. Turbocharger 28 includes therein a known boost pressure sensor 30 that is electrically connected to input IN3 of control computer 12 via signal path 32. Sensor 30 is operable, as is known in the art, to sense boost air pressure provided by the turbocharger 28 to the intake manifold of the engine (not shown), and provide a corresponding boost pressure signal on signal path 32. Turbocharger 28 further includes a wastegate valve 34 of known construction that is electrically connected to output OUT2 of control computer 12 via signal path 36. In operation, control computer 12 is responsive to the boost pressure signal on signal path 36 to control wastegate valve settings (via signal path 36) to thereby regulate the amount of exhaust gas provided to the inlet port of the turbocharger, as is known in the art. In one embodiment, the wastegate 34 has four discrete setting (WG0–WG3), wherein each respective setting provides for a different boost air pressure level. It is to be understood, however, that wastegate valve 34 may have any number of discrete wastegate settings or may have continuously variable settings, both of which configurations are well known in the art, wherein wastegate valve 34 is responsive to signals provided by control computer 12 to achieve such wastegate settings. As used herein, the term "default wastegate setting" is defined as any wastegate setting controlled by control computer 12 pursuant to typical and normal operation of turbocharger 28 and engine 14. Under certain circumstances, control computer 12 is operable to override the default wastegate setting and control the actual setting pursuant to a downhill vehicle control strategy, in accordance with the present invention and as will be described in greater detail hereinafter.

Engine 14 further includes a fuel system 38 electrically connected to output OUT3 of control computer 12 via signal path 40. Control computer 12 is responsive to a torque request signal, among other engine/vehicle operating parameters, wherein the torque request signal is typically provided via manual actuation of an accelerator pedal (not shown) under manual fueling control or via a desired speed setting of cruise control unit 56 under cruise control operation, to produce one or more fueling signals on signal path 40. The fuel system 38 is responsive to the one or more fueling signals to supply fuel to engine 14 as is known in the art.

Engine 14 further includes a known engine compression brake unit 42 that is electrically connected to output OUT4 of control computer 12 via a number N of signal paths 44, wherein N may be any integer. Engine compression brake unit 42 includes an exhaust valve actuator for each cylinder of the engine 14 and is responsive to signals provided on signal paths 44 to actuate the various valve actuators to provide for engine braking, or engine torque retarding, operation as is known in the art. An engine compression brake control unit (not shown) is typically located in the cab area of the vehicle and includes a number of switches for selecting an engine retarding torque level. For example, many engine compression brake units typically provide for "low", "medium" and "high" engine retarding torque levels, and for a six cylinder engine signal path 44 may accordingly include three signals lines wherein each signal line is connected to a pair of exhaust valve actuators. Thus, in a six-cylinder engine, two exhaust valve actuators are activated at the "low" engine retarding torque level, four exhaust valve actuators are activated at the "medium" engine retarding torque level, and all six exhaust valve actuators are activated at the "high" engine retarding torque level. It is to be understood, however, that N may be any integer value so that engine compression brake unit 42 may have only a single engine torque retarding setting or at least as many engine retarding torque settings as the number of engine cylinders. In any case, control computer 12 is operable to control activation/deactivation of engine brake control unit 42 pursuant to a request therefore via an engine compression brake control panel (not shown) as is known, and further pursuant to a downhill vehicle operation control strategy of the present invention, as will be described in greater detail hereinafter.

In one embodiment, control computer 12 is operable to determine a presently engaged gear ratio of the transmission 16 by computing a ratio of the engine speed signal and the vehicle speed signal as is known in the art. Alternatively, transmission 16 may include means for determining the presently engaged gear ratio and providing a signal corresponding thereto to control computer 12. For example, transmission 16 may include a module 46 that is electrically connected to an input/output port I/O1 of control computer 12 via a number, M, of signal paths 48. Moreover, module 46 may include an auxiliary computer or microprocessor 50 operable to determine, among other transmission operating parameters, the presently engaged gear ratio. In any case, signal paths 48 preferably include a number of signal lines which comprise a serial data link such as an SAE J1939 data link. Via such a serial data link, control computer 12 and auxiliary computer 50 typically share engine/vehicle and transmission operating information, and auxiliary computer 50 may accordingly be operable to execute any one or more of the downhill vehicle control strategies of the present invention, as will be described in greater detail hereinafter.

The vehicle carrying engine 14 includes service brakes 52 that are typically responsive to manual actuation thereof to retard wheel motion, as is known in the art, and are further typically configured with a switch (not shown) which is connected to control computer 12 so that control computer 12 may monitor service brake activity. As they relate to the present invention, the service brakes 52 are further electronically actuatable and include an input that is electrically connected to output OUT1 of control computer 12 via signal path 54. In operation, the service brakes 52 include one or more actuators that are responsive to one or more service brake signals, provided by control computer 12 on signal path 54, to actuate the service brakes 52.

System 10 further includes a known cruise control unit 56 having an on/off switch 58 electrically connected to input IN4 of control computer 12 via signal path 60. A set/coast (S/C) switch 62 is connected to input IN5 of control computer 12 via signal path 64, and a resume/accel (R/A) switch 66 is connected to input IN6 of control computer 12 via signal path 68. Control computer 12 is responsive to cruise control unit 56 in a typical and known fashion in that if on/off switch 58 is in the "on" position, control computer 12 is responsive set/coast and/or resume/accel signals (torque request signals) provided on signal paths 64 and 68 respectively to thereby achieve and/or maintain a desired vehicle speed.

System 10 may further include a driver interface/monitor 70 that is connected to an input/output port I/O2 of control computer 12 via a number, P, of signal paths 72, wherein P may be any integer. Interface/monitor 70 preferably includes a display as well as a number k of operator selectable keys, buttons, knobs, or the like, 74a, 74b, . . . , 74k, wherein k may be any integer. Interface/monitor 70 is preferably operable to collect and provide engine/vehicle operating information to the vehicle operator via the interface/monitor display, and is further operable to permit the vehicle operator to select viewable information and/or to program engine/vehicle operating limits and/or parameters. An example of a monitoring system that may be used in the present invention as interface/monitor 70 is described in U.S. Pat. No. 5,303,163 to Ebaugh et al., which is assigned to the assignee of the present invention, and the contents of which are incorporated herein by reference. As it relates to the present invention, however, interface/monitor 70 need only include a display for displaying engine/vehicle operating conditions, such as vehicle or engine speed, for example, and a number of user selectable keys or the like to provide a user with the ability to manually instruct control computer 12.

System 10 may further include a Global Positioning System (GPS) receiving unit 76 that is electrically connected to input IN7 of control computer 12 via signal path 78. In one embodiment, GPS unit 76 is operable to receive broadcast GPS signals, convert such signals to at least latitudinal and longitudinal coordinates, and optionally including altitudinal coordinates, and provide one or more signals on signal path 78 corresponding to such coordinates. Alternatively, GPS unit 76 may receive the broadcast GPS signals and supply such signals to control computer 12 via signal path 78, wherein control computer 12 is operable to convert the broadcast GPS signals to latitudinal and longitudinal (and optionally altitudinal) coordinates. In either case, GPS unit 76 is operable to provide control computer 12 with information relating to a present vehicle location.

In accordance with the present invention, system 10 is operable to control engine speed or vehicle speed during downhill vehicle operation to thereby provide for a controlled descent at a desired vehicle speed. A controlled descent is defined as achieving a desired engine or vehicle speed while descending a negative hill or grade, and once achieved, further maintaining the desired engine or vehicle speed for the duration of the descent.

In one embodiment, system 10 is responsive to detection of a potential runaway vehicle condition to control engine brake unit 42, turbocharger boost pressure via control of the setting of wastegate 34, service brakes 52 and/or automatic shifting of the transmission 16 to thereby provide for a controlled descent down a negative grade at a desired vehicle speed and thereby prevent a runaway vehicle condition. In an alternate embodiment, system 10 is responsive to automatic engine brake activity after setting a desired engine or vehicle speed to thereafter control engine brake unit 42, turbocharger boost pressure via control of the setting of wastegate 34, service brakes 52 and/or automatic shifting of the transmission 16 to thereby provide for a controlled descent down a negative grade at a desired vehicle speed.

Figure 2:
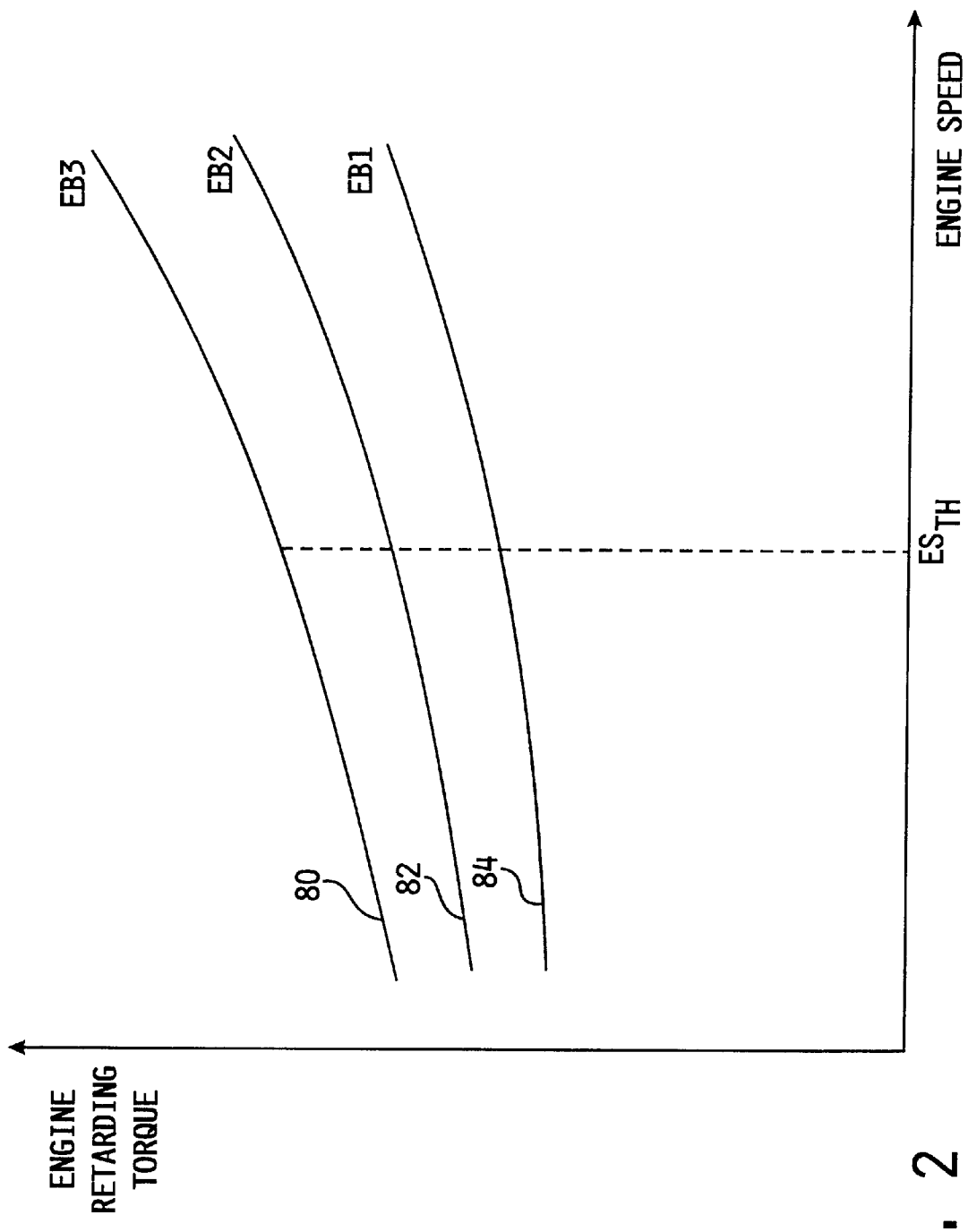
FIG. 2 is a plot of engine retarding torque vs. engine speed illustrating the effect of various engine compression brake settings on engine operation.

In either case, control computer 12 may be operable to control engine brake activity via engine brake unit 42, wherein engine brake unit 42 may include any number of engine brake settings between a single engine brake setting and a number of settings equal to at least as many as the number of cylinders of engine 14. Referring to FIG. 2, a plot of engine retarding torque vs. engine speed is shown illustrating relative engine retarding torque capacities of an engine brake unit 42 for a six cylinder diesel engine, wherein the example brake unit 42 has three brake capacity settings; i.e. a "high" engine brake setting EB3, as illustrated by retarding torque function 80, a "medium" engine brake setting EB2, as illustrated by retarding torque function 82, and a "low" engine brake setting EB1, as illustrated by retarding torque function 84. As is typical with engine brake units, engine brake settings EB1–EB3 are somewhat linear below an engine speed $ES_{TH}$, and become more non-linear above $ES_{TH}$. The non-linear nature of settings EB1–EB3 illustrate that engine brake unit 42 is more efficient at higher engine speeds, as is known in the art. It is to be understood that the engine brake embodiment shown in FIG. 2 illustrates only one preferred embodiment of engine brake unit 42, and that the present invention contemplates embodiments of engine brake unit 42 having any number of discrete engine brake settings EB1–EB$_j$, wherein j may be any integer including zero.

Figure 3:
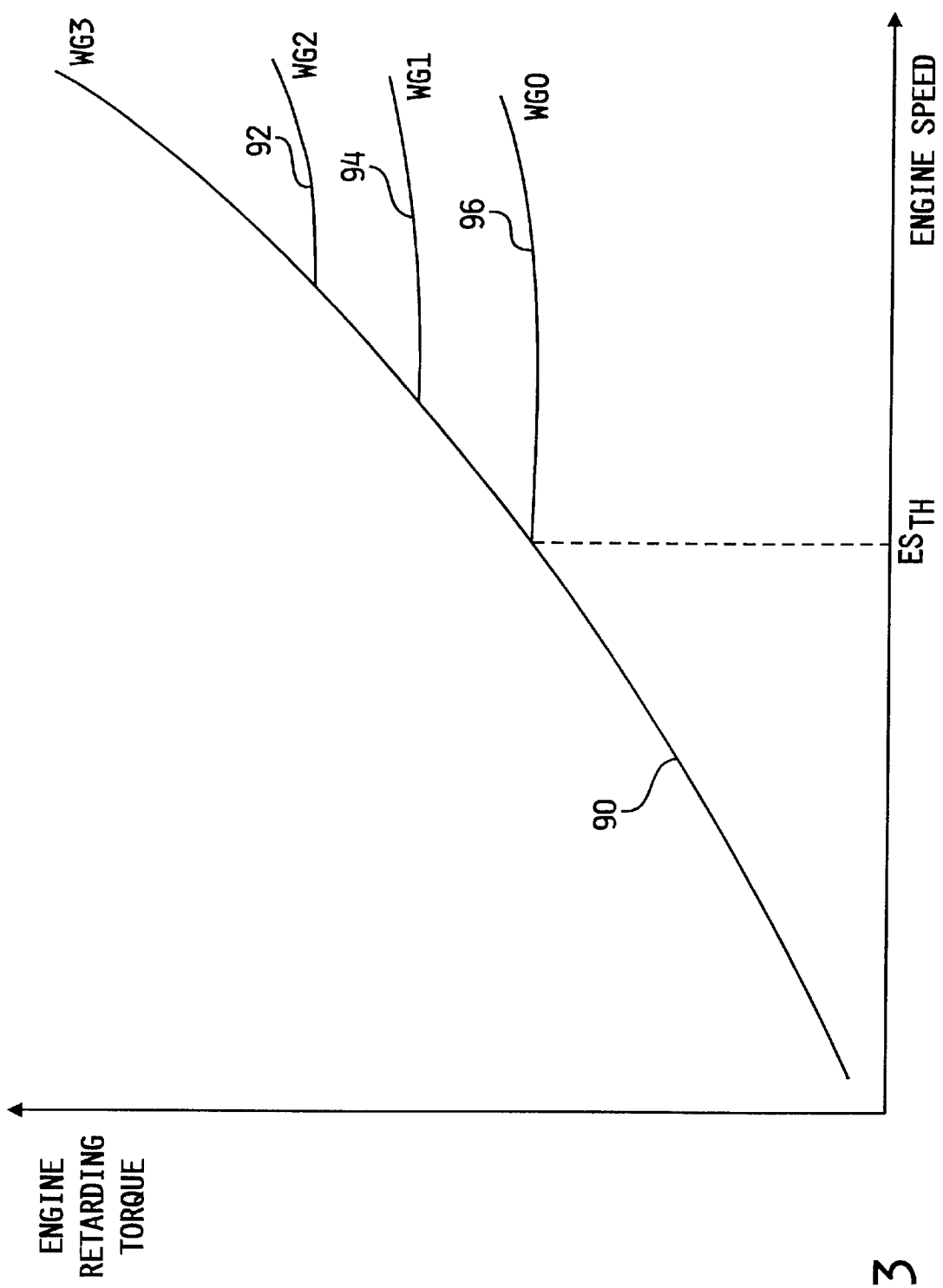
FIG. 3 is a plot of engine retarding torque vs. engine speed illustrating the effect of various turbocharger wastegate settings on engine operation.
Figure 4A:
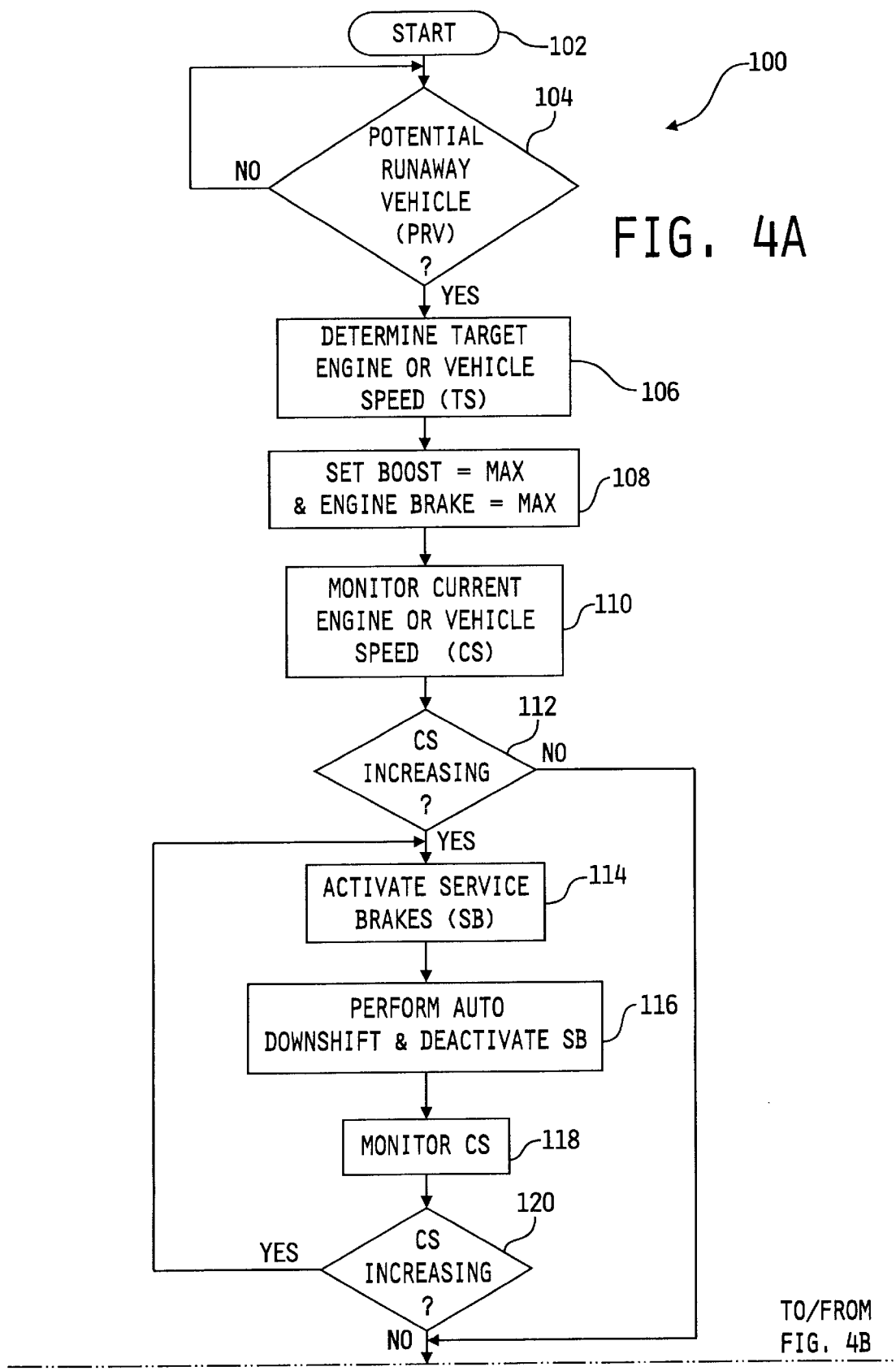
FIG. 4, consisting of FIGS. 4A through 4D, is a flowchart of a software algorithm executable by the system of FIG. 1 and illustrating one preferred technique for controlling downhill vehicle operation, in accordance with the present invention.
Figure 4B:
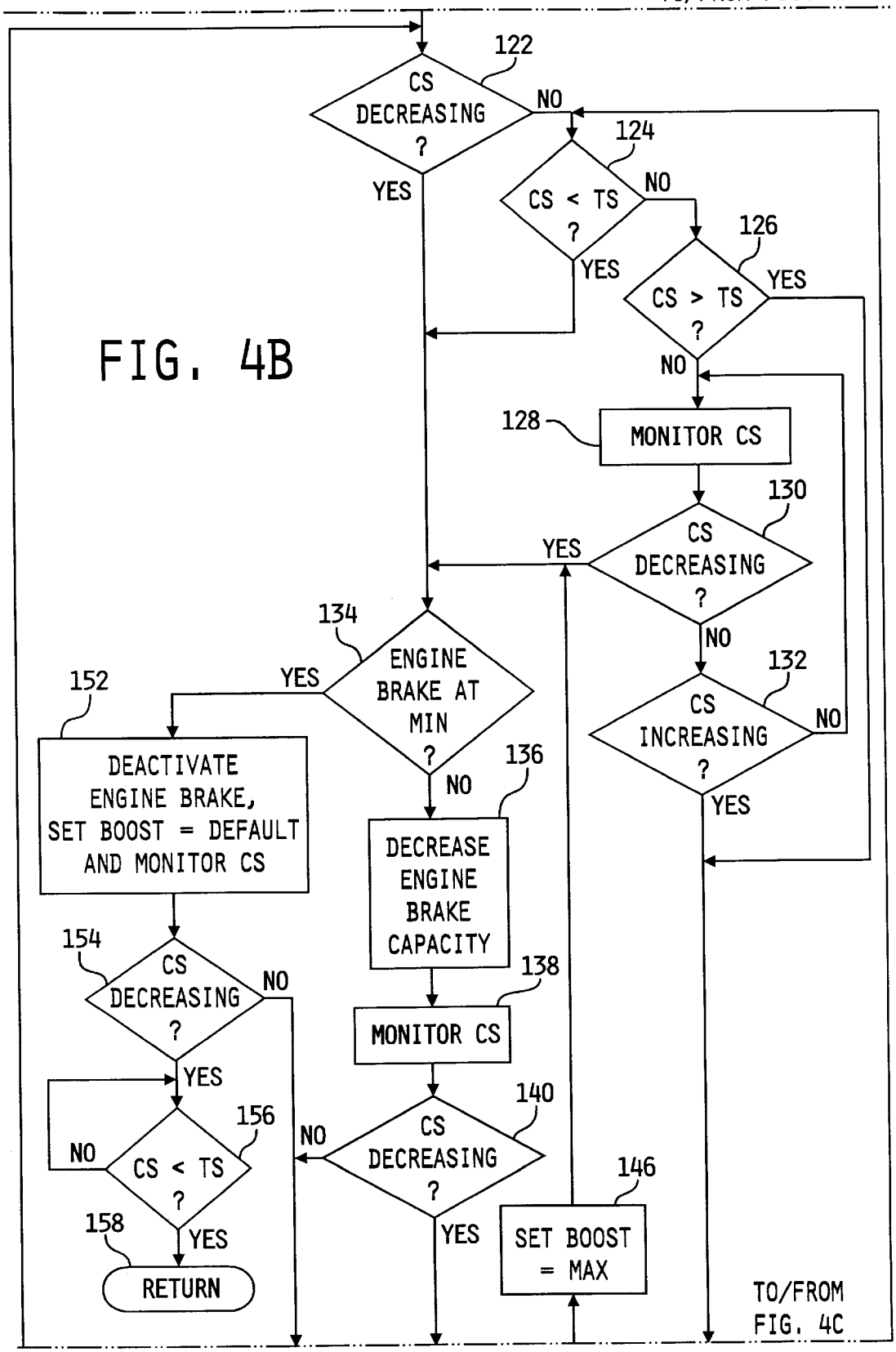
Figure 4D:
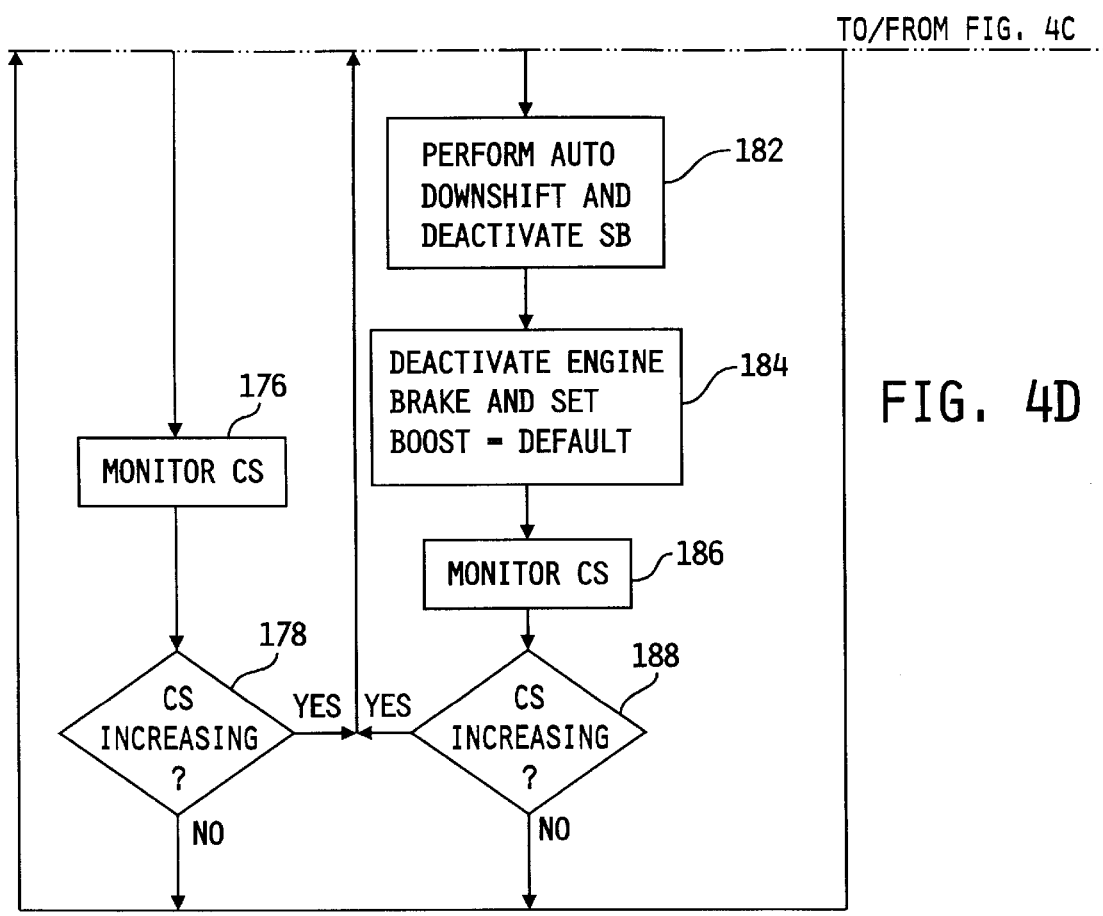

In accordance with either control strategy of the present invention, control computer 12 may further be operable to control turbocharger boost pressure via controlling the settings of wastegate 34, wherein wastegate 34 may be controlled to any number of discrete wastegate settings or may alternatively be controlled to an infinite number of positions in the event that wastegate 34 is a continuously variable wastegate. In either case, control computer 12 is operable to control the settings of wastegate 34, in accordance with one or more of the control strategies of the present invention, to thereby modulate engine retarding torque. Referring to FIG. 3, a plot of engine retarding torque vs. engine speed is shown illustrating the effect on relative engine retarding torque of turbocharger wastegate control for an example turbocharger wastegate 34 having four wastegate settings; i.e. a "high boost" wastegate setting WG3, as illustrated by retarding torque function 90, a "mid-high boost" wastegate setting WG2, as illustrated by retarding torque function 92, a "mid-low boost" wastegate setting WG1, as illustrated by retarding torque function 94, and a "low boost" wastegate setting WG0, as illustrated by retarding torque function 96. As is known in the art, modulation of the settings of wastegate 34 has negligible effect on engine retarding torque below an engine speed $ES_{TH}$, and conversely has a pronounced effect on engine retarding torque above engine speed $ES_{TH}$. Referring now to FIG. 4, which is composed of FIGS. 4A–4D, a flowchart is shown illustrating one preferred embodiment of a software algorithm 100 for controlling downhill vehicle operation to thereby prevent a runaway vehicle condition, in accordance with one aspect of the present invention. Algorithm 100 is preferably stored within memory 15 and is executed by control computer 12, and algorithm 100 will be described accordingly hereinafter. It is to be understood, however, that the present invention contemplates that any of the algorithms desired herein may alternatively be executed by an auxiliary computer in communication with control computer 12, such as transmission control computer 50, wherein control computer 12 is operable to exchange any necessary operational information with the auxiliary computer via one or more appropriate signal paths, and is further operable to cooperate with the auxiliary computer in controlling the various engine/vehicle components in order to effectuate any of the control strategies of the present invention. In any event, algorithm 100 begins at step 104 wherein control computer 12 is operable to determine whether a potential runaway vehicle condition (PRV) exists. In one embodiment, a potential runaway vehicle condition is characterized by a vehicle motoring condition; i.e. the vehicle drivetrain is being driven by the vehicle wheels rather than by the engine, along with an increasing engine or vehicle speed. In other words, the vehicle is descending a negative grade and picking up speed. In this embodiment, control computer 12 is preferably operable to detect a potential runaway vehicle condition by monitoring the fueling command provided to fuel system 38 and either engine or vehicle speed, wherein a potential runaway vehicle condition exists if a non-fueling or zero fueling condition exists, and engine or vehicle speed is increasing, preferably above some predefined rate. However, the present invention contemplates determining a vehicle motoring condition in accordance with any other known technique, and determining that a runaway vehicle condition exists if a vehicle motoring condition exists and engine or vehicle speed is increasing.

In an alternative embodiment of step 104, a potential runaway vehicle condition is characterized by a vehicle motoring condition followed by an automatic upshift to a numerically higher gear, which indicates that engine or vehicle speed has increased sufficiently under a vehicle motoring condition to cause a computer-controlled upshift. In this embodiment, control computer 12 is operable to detect a potential runaway vehicle condition by monitoring the fueling command and currently engaged gear ratio, wherein a potential runaway vehicle condition exists if a non-fueling condition exists whereafter an upshift to a numerically higher transmission gear occurs. Currently engaged gear ratio may be determined in any of a number of known ways, and is preferably determined by control computer 12 as a ratio of engine speed, provided by engine speed sensor 20, and vehicle speed, provided by vehicle speed sensor 24. Alternatively, transmission module 46 may include known means for determining currently engaged gear ratio, such as electrical and/or mechanical components, including switches and the like, wherein currently engaged gear ratio information is transmitted by transmission computer 50 to control computer 12 via signal path 48. Alternatively still, auxiliary computer 50 may receive engine speed and vehicle speed information from control computer 12, compute currently engaged gear ratio as a ratio thereof, and transmit gear ratio information back to control computer 12. Those skilled in the art will recognize that other known techniques for determining currently engaged gear ratio exist, and that any such other techniques may be used with the present invention without detracting from the scope thereof.

In another alternative embodiment of step 104 of algorithm 100, the vehicle may include an inclinometer (not shown) or other known device operable to detect the slope or grade of the road being traveled, and provide a slope signal to control computer 12 corresponding thereto. In this embodiment, control computer 12 is operable to determine that a runaway vehicle condition exists if the slope signal indicates a negative grade greater than some predefined grade or slope value.

In still another alternative embodiment of step 104, control computer may be responsive to GPS information provided thereto by GPS receiver 76 to determine whether a runaway vehicle condition exists. In this embodiment, control computer 12 is operable to compare the present GPS coordinates (corresponding to present vehicle location) with GPS coordinates stored in memory 15, or provided to control computer from some remote source via a suitable wireless link (e.g. cellular phone link, RF link, etc.), and make a determination based on this comparison as to whether the vehicle is approaching or currently traversing a downhill grade that has a negative grade sufficiently large to result in a potential runaway vehicle condition. If so, control computer 12 is operable to determine at step 104 that a potential runaway vehicle condition exists. Alternatively, control computer 12 may be operable in this embodiment to monitor altitudinal information provided thereto by GPS receiver 76, and to determine that a potential runaway vehicle condition exists if the altitude of the vehicle has changed more than some predefined amount over a recent time interval.

If, at step 104, control computer 12 determines that a potential runaway vehicle condition does not exist, algorithm execution loops back to step 104 until such condition is detected. If control computer 12 determines at step 104 that a potential runaway vehicle condition does exist, algorithm execution continues at step 106 where control computer 12 determines a target engine or vehicle speed TS for traversing the downhill grade. In one embodiment, control computer 12 is operable to determine TS as a learned engine or vehicle speed; i.e. an average engine or vehicle speed for some time period or distance prior to determining that a potential runaway vehicle condition exists. For example, control computer 12 may be operable to determine TS in this embodiment as an average vehicle speed for 10 seconds prior to executing step 106.

In an alternate embodiment, control computer 12 is operable to determine TS as a driver requested speed provided thereto via cruise control unit 56, interface/monitor 70 or other operator input means. For example, control computer 12 may be operable to determine TS as the set speed of cruise control unit 56 if cruise control unit 56 is active.

In yet another alternative embodiment, control computer 12 is operable to determine TS as a function of present vehicle location. In this embodiment, memory 15 has stored therein, or has access to, target speed values corresponding to vehicle location. Control computer 12 is accordingly operable at step 104 to determine present vehicle location, as described hereinabove, and determine from memory 15 or from information provided thereto from a remote source a target speed value corresponding to present vehicle location.

In still another alternative embodiment, step 106 is omitted and algorithm 100 is operable, as described hereinafter, to control engine or vehicle speed to a constant speed at which the vehicle will naturally undergo a controlled descent down the grade. In this embodiment, the speed (engine or vehicle) at which the vehicle will naturally undergo a controlled descent (i.e. constant speed) down the particular grade encountered will depend on many factors including vehicle configuration, tire rolling resistance, aerodynamic factors, engine and vehicle speed prior to the potential runaway vehicle condition, engaged gear ratio, vehicle weight, road conditions and other factors. In this embodiment, no target speed TS exists and control computer 12 is instead operable to control engine brake unit 42, wastegate 34, service brakes 52 and/or transmission gear shifting in such a manner so as to provide for a substantially constant engine or vehicle speed for the duration of the potential runaway vehicle condition.

Following step 106, algorithm execution continues at step 108 where control computer 12 is operable to control wastegate 34 to thereby set turbocharger boost pressure at its maximum allowable value and to control engine brake unit 42 to provide for maximum engine retarding torque. As described with respect to FIGS. 2 and 3, control computer 12 is thus operable at step 108 to provide for an aggressive engine braking strategy by controlling both wastegate 34 and engine brake unit 42 to produce a maximum engine retarding torque. Following step 108, control computer 12 is operable at step 110 to monitor current engine or vehicle speed (CS). Thereafter at step 112, control computer 12 is operable to determine whether CS is increasing. If so, control computer is operable at step 114 to activate the service brakes 52, at step 116 to perform an automatic downshift to a numerically lower transmission gear, in a well known manner, at step 118 to again monitor CS, and at step 120 to determine whether if CS is still increasing. Preferably, anytime control computer 12 is operable to activate the service brakes 52, such as at step 114 of algorithm 100, control computer 12 is operable to activate the service brakes 52 only to the extent necessary to slow the vehicle to the highest vehicle speed necessary to conduct an automatic downshift. In this manner, service brake wear is minimized and engine speed is returned, after the downshift, to an engine speed (typically referred to as governed speed) at which the retarding capacity of engine brake unit 42 is most efficient. If, at step 120 control computer 12 determines that CS is still increasing algorithm 100 loops back to step 114 for another automatic downshift sequence. If not, and if CS is not increasing at step 112, algorithm execution continues therefrom at step 122.

From the foregoing it should be apparent that steps 108 and 120 of algorithm 100 implement an aggressive speed reduction strategy in order to control engine or vehicle speed in response to a potential runaway vehicle condition. Upon detection of a potential runaway vehicle condition, maximum engine retarding torque is preferably provided via control of engine brake unit 42 and wastegate 34. If engine or vehicle speed is still increasing an automatic downshift is implemented. Thereafter if engine or vehicle speed is still increasing, another automatic downshift is implemented and so on. In this manner, control computer 12 is operable to provide for maximum engine torque retarding capacity via control of engine brake unit 42 and wastegate 34, and immediately "find" an appropriate transmission gear wherein the current engine or vehicle speed is no longer increasing. The remainder of algorithm loo is directed to controlling engine or vehicle speed to a constant speed for the remainder of the descent down the grade.

Referring now to FIG. 4B, control computer 12 is operable at step 122 to determine whether CS is decreasing. If not, algorithm execution continues at step 124 where control computer 12 is operable to determine whether the current engine or vehicle speed CS is less than the target speed TS. If not, algorithm execution continues at step 126 where control computer 12 is operable to determine whether CS is greater than the target speed TS. If not, control computer is operable to monitor CS at step 128 and determine whether CS is decreasing or increasing at steps 130 and 132. As long as CS remains constant, algorithm execution will loop between the "no" branch of step 132 and step 128. If, however, control computer determines either at step 126 or at step 132 that CS is increasing, algorithm execution continues at step 162 (FIG. 4C). If, on the other hand, control computer 12 determines at step 122 or step 130 that CS is decreasing, or if control computer 12 determines at step 124 that CS is less than TS, algorithm execution continues at step 134.

From the foregoing, it should be apparent that steps 124–132 of algorithm 100 are executed when the current speed value CS is constant (neither increasing at step 120 nor decreasing at step 122). Under such conditions, control computer 12 is operable to determine whether the current constant speed is the target speed value TS. If not, algorithm 100 branches to steps operable to adjust CS to the TS value. In accordance with one embodiment of algorithm 100 where the TS value does not exist as described hereinabove, steps 124 and 126 would be omitted and the "no" branch of step 122 would lead directly to step 128. As long as the constant CS value is equal to the TS value, or if no TS value exists, control computer 12 is operable at steps 128–132 to simply monitor the current speed CS and branch to appropriate areas of algorithm 100 if CS is found to increase or decrease.

Steps 134–158 of algorithm 100 are directed to controlling various engine/vehicle components in the event that the current speed value CS is decreasing. At step 134, control computer 12 is operable to determine whether the engine brake unit 42 is set at its minimum torque retarding capacity. If not, control computer 12 is operable at step 136 to decrease the torque retarding capacity of engine brake unit 42. In one embodiment, control computer 12 is operable at step 136 to incrementally decrease the torque retarding capacity of engine brake unit 42 (i.e. control unit 42 to the next lower brake setting). However, the present invention contemplates that control computer 12 may alternatively be operable at step 136 to decrease the torque retarding capacity of unit 42 by any desired amount. In any case, control computer 12 is thereafter operable at steps 138 and 140 to monitor the current engine or vehicle speed CS and determine whether CS is still decreasing. If not, algorithm execution continues at step 160.

If, however, control computer 12 determines at step 140 that CS is still decreasing, algorithm execution continues at step 142 (FIG. 4C) where control computer 12 is operable to determine whether wastegate 34 is set such that turbocharger boost pressure is at its minimum controllable pressure. If so, control computer adjusts wastegate 34 to set turbocharger boost pressure at its maximum controllable value at step 146 and loops back to step 134. If, at step 142, control computer 12 determines that wastegate 34 is set such that turbocharger boost pressure is not at its minimum controllable pressure, control computer 12 is operable at step 144 to control wastegate 34 to thereby decrease turbocharger boost pressure. In one embodiment, control computer 12 is operable at step 144 to incrementally decrease the setting of wastegate 34 to thereby incrementally decrease the turbocharger boost pressure (i.e. control wastegate to the next lower boost pressure setting). However, the present invention contemplates that control computer 12 may alternatively be operable at step 144 to decrease the turbocharger boost pressure via control of wastegate 34 by any desired amount. In any case, control computer 12 is thereafter operable at steps 148 and 150 to monitor the current engine or vehicle speed CS and determine whether CS is still decreasing. If so, algorithm execution loops back to step 142. If, however, control computer 12 determines at step 150 that CS is not decreasing, algorithm execution continues at step 160.

It should be apparent from the foregoing that control computer 12 is operable at steps 134–150 to decrease the engine torque retarding effects of engine brake unit 42 and/or turbocharger boost pressure in the event that the current engine or vehicle speed is decreasing. In the embodiment illustrated in algorithm 100, control computer 12 is preferably operable to implement this decrease in engine torque retardation by incrementally decreasing turbocharger boost pressure through its entire adjustable range for every incremental decrease in the engine torque retarding capacity of engine brake unit 42, and monitoring the current engine or vehicle speed value CS at each step. As long as CS continues to decrease, algorithm 100 remains in the CS reduction loop of steps 134–150 until neither engine brake unit 42 nor wastegate 34 are downwardly adjustable. Thus, if CS is decreasing and control computer 12 determines at step 134 that the engine torque retarding capacity of engine brake unit 42 is set at its minimum setting, control computer 12 is operable at steps 152 and 154 to deactivate engine brake unit 42, control wastegate 34 so as to provide for a default turbocharger boost pressure setting (i.e. a boost pressure value that would exist in the absence of algorithm 100), monitor CS and determine whether CS is still decreasing. If not, algorithm execution continues at step 160. If, however, control computer 12 determines at step 154 that CS is still decreasing, control computer 12 is operable at step 156 to loop back on itself until the current engine or vehicle speed value CS is less than the target speed value TS. Thereafter at step 158, algorithm 100 is returned to its calling routine. Alternatively, algorithm execution may loop from the "yes" branch of step 156 back to step 104 for continuous operation of algorithm 100.

Control computer 12 is thus operable at steps 152–158 to deactivate all engine torque retarding devices if CS is decreasing with engine brake unit 42 set for minimum engine torque retarding capacity and, if CS continues to decrease, control computer 12 is operable to interpret this as the vehicle having completed traversal of the downhill grade such that engine torque retardation is no longer needed. In this case, control computer 12 assumes that algorithm loo is no longer needed and either exits or loops back to step 104 to monitor conditions indicative of a potential runaway vehicle condition. It should be pointed out that, in an embodiment of algorithm 100 wherein no target speed value TS exists as described hereinabove, step 156 would be omitted.

At step 160, control computer 12 has determined that CS is no longer decreasing and determines whether CS is now increasing. If not, CS is constant and algorithm 100 accordingly loops back to step 124 to process a constant CS value as described hereinabove. If, however, control computer 12 determines at step 160 that CS is now increasing, algorithm 100 executes a series of steps 162–188 which are directed to controlling the various engine/vehicle components to thereby decrease the current engine or vehicle speed CS.

At step 162, control computer 12 is operable to determine whether wastegate 34 is set such that turbocharger boost pressure is set at its maximum controllable value. If not, control computer 12 is operable at steps 164–168 to control wastegate 34 to thereby increase turbocharger boost pressure, monitor the current engine or vehicle speed value CS, and determine whether CS is still increasing. If not algorithm execution continues at step 122. If, however, control computer 12 determines at step 168 that CS is still increasing, algorithm execution loops back to step 162 for a further increase in boost pressure if boost pressure is not at its maximum controllable value. In one embodiment of algorithm 100, control computer 12 is operable at step 164 to incrementally increase the setting of wastegate 34 to thereby incrementally increase the turbocharger boost pressure (i.e. control wastegate to the next higher boost pressure setting). However, the present invention contemplates that control computer 12 may alternatively be operable at step 164 to increase the turbocharger boost pressure via control of wastegate 34 by any desired amount.

In any case, if control computer 12 determines at step 162 that wastegate 34 is set such that turbocharger boost pressure is at its maximum value, algorithm execution continues at step 170 where control computer 12 determines whether the engine brake unit 42 is currently set for maximum engine torque retarding capacity. If not, control computer 12 is operable at steps 172–178 to control wastegate 34 to thereby set turbocharger boost pressure to its minimum controllable pressure, control engine brake unit 42 to increase the engine torque retarding capacity thereof, monitor CS and determine whether CS is still increasing. If not, algorithm execution loops from step 178 back to step 122. If, however, control computer 12 determines at step 178 that CS is still increasing, algorithm execution loops back to step 162. In one embodiment of algorithm 100, control computer 12 is operable at step 174 to incrementally increase the torque retarding capacity of engine brake unit 42 (i.e. control unit 42 to the next higher brake setting). However, the present invention contemplates that control computer 12 may alternatively be operable at step 174 to increase the torque retarding capacity of unit 42 by any desired amount.

In any case, if control computer 12 determines at step 170 that engine brake unit 42 is currently set for maximum engine torque retarding capacity, control computer 12 is thereafter operable at steps 180–188 to activate the service brakes 52, perform an automatic downshift to a numerically lower transmission gear, deactivate the service brakes 52, deactivate engine brake unit 42, set wastegate 34 to provide for default turbocharger boost pressure (i.e. what boost pressure would be in the absence of algorithm 100), monitor CS and determine whether CS is still increasing. If, at step 188, control computer 12 determines that CS is still increasing, algorithm 100 loops back to step 162. If, however, control computer 12 determines at step 188 that CS is no longer increasing, algorithm execution loops back to step 122.

From the foregoing, it should be apparent that control computer 12 is operable at steps 162–188 to increase the engine torque retarding effects of engine brake unit 42 and/or turbocharger boost pressure in the event that the current engine or vehicle speed is increasing. In the embodiment illustrated in algorithm 100, control computer 12 is preferably operable to implement this decrease in engine torque retardation by incrementally increasing turbocharger boost pressure through its entire adjustable range for every incremental increase in the engine torque retarding capacity of engine brake unit 42, and monitoring the current engine or vehicle speed value CS at each step. As long as CS continues to increase, algorithm 100 remains in the CS increase loop of steps 162–178 until neither engine brake unit 42 nor wastegate 34 are upwardly adjustable, in which case control computer 12 is operable at steps 180–188 to perform an automatic downshift to a next lower gear of transmission 16, reset engine brake unit 42 and wastegate 34, and reexecute the CS increase loop of steps 162–178 if CS continues to increase after the auto-downshift. When control computer 12 eventually determines that CS is no longer increasing, algorithm execution loops back to the CS constant loop of steps 124–132 and/or the CS reduction loop of steps 134–150. In this manner, engine or vehicle speed is controlled to the target speed value TS, or to a natural constant speed in the case that a TS value does not exist as described hereinabove, for the duration of traversal of the downhill grade to thereby provide for a controlled descent down the grade under potential runaway vehicle conditions. It is to be understood, however, that algorithm 100 represents only one preferred control strategy for providing for a controlled descent down a negative grade under potential runaway vehicle conditions, and that the present invention contemplates other strategies for achieving this same purpose. For example, algorithm 100 shown and described with respect to FIGS. 4A–4D implements an aggressive strategy wherein a large amount of engine retarding torque is added and/or automatic downshifting is performed immediately upon detection of a potential runaway vehicle condition, and wherein engine retarding torque capacity and/or automatic gear selection is thereafter adjusted until the desired engine or vehicle speed is achieved. An alternative strategy for algorithm 100 may implement a less aggressive strategy wherein engine retarding torque capacity is gradually increased and/or automatic downshifting performed until engine or vehicle speed has decreased to the desired engine or vehicle speed. Alternatively still, algorithm loo may implement an adaptive control strategy wherein control computer 12 is be operable, upon detection of a potential runaway vehicle condition, to first estimate or otherwise determine the steepness of the grade, such as via an inclinometer, GPS or via determination of the rate of change of engine or vehicle speed, for example, and determine therefrom how much engine retarding torque and/or automatic downshifting is needed to achieve the desired engine or vehicle speed and/or desired engine/vehicle deceleration rate, which of the available engine torque retarding techniques should be used based on this determination, and in what order. Thus for extremely steep grades, one or more downshifts may be immediately required prior to modulating the engine retarding torque capacities of the engine compression brake unit 42 and/or turbocharger boost pressure (via control of wastegate valve 34), and for some shallow grades a controlled descent may be achieved by controlling only the retarding torque capacity of the engine compression brake unit 42, the turbocharger (via control of wastegate valve 34), or both. Those skilled in the art will recognize that such alternative control techniques, although not illustrated herein in flowchart form, are well within the ordinary skill level of a software programmer, and that such alternative control techniques fall within the scope of the present invention. In yet another alternative embodiment, algorithm 100 may implement a control strategy wherein only automatic shifting between transmission gears is controlled, or wherein only engine compression brake operation is controlled, in order to provide for a controlled descent as described hereinabove.

Those skilled in the art will also recognize that in many cases a downhill descent may involve many grade variations, and the control concepts of the present invention are designed to take such grade variations into account. For example, in the embodiment described in the flowchart of FIG. 4, control computer 12 is operable adjust the current engine or vehicle speed CS until CS continues to decrease with all of the engine torque retardation components disabled. Thus, if a particular downhill length of road includes a first steep grade followed by a flatter portion which is itself followed by a second steep grade, the control techniques used to provide for a controlled descent down the first grade may be too aggressive for the flatter portion, and the engine or vehicle speed will accordingly decrease on the flatter portion. If the flatter portion is long enough, the current engine or vehicle speed CS will decrease sufficiently to cause control computer 12 to exit algorithm 100 and resume default operation. If the second steep grade is sufficient to indicate a potential runaway vehicle condition, control computer 12 will re-execute algorithm 100 and a runaway vehicle condition will be avoided as described hereinabove. If, however, the flatter portion is not sufficiently long, control computer 12 will be operable to maintain execution of algorithm 100 and control engine or vehicle speed in a fashion described hereinabove when the vehicle encounters the second steep grade to thereby continue to prevent a runaway vehicle condition on the second grade.

Figure 5:
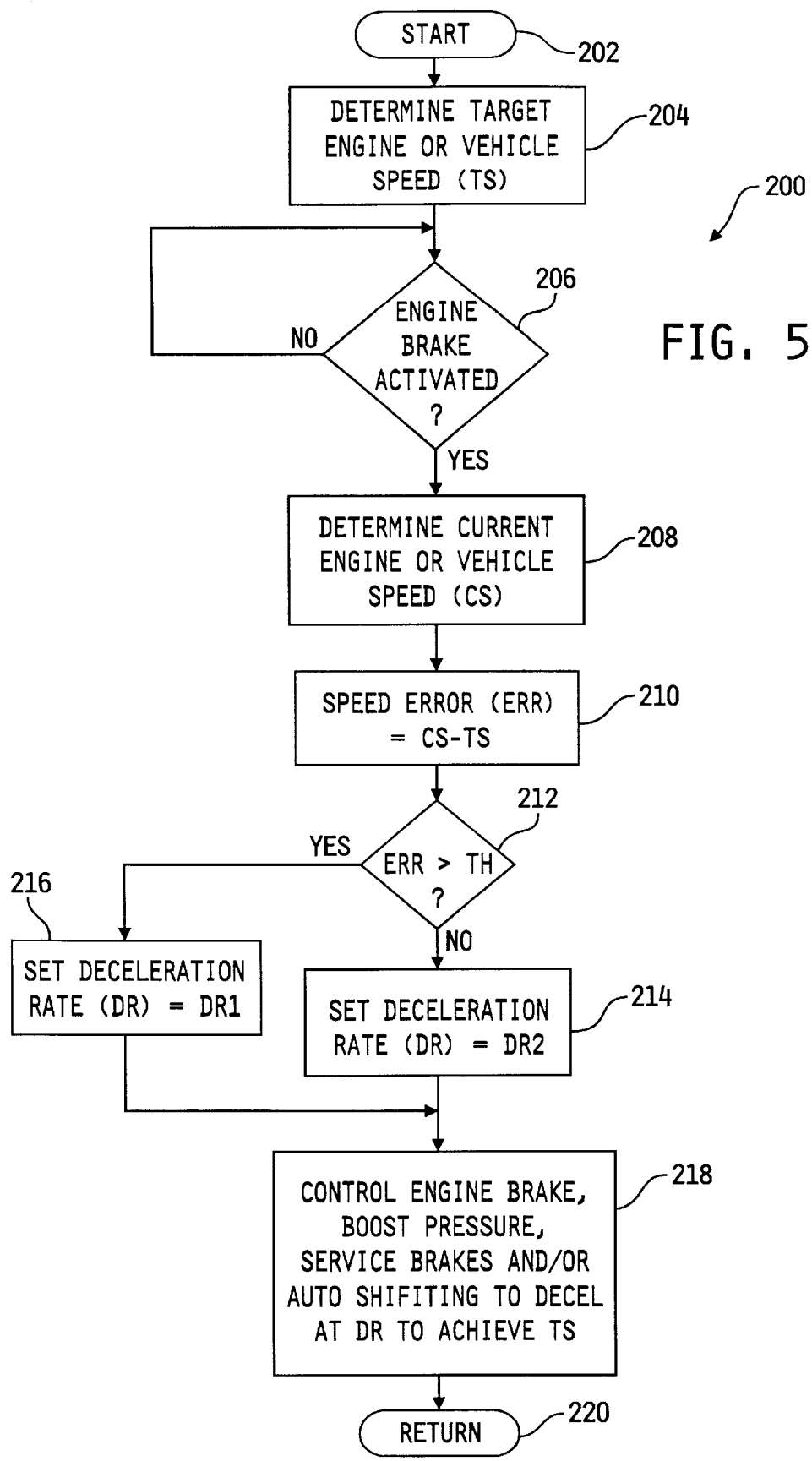
FIG. 5 is a flowchart of a software algorithm executable by the system of FIG. 1 illustrating another preferred technique for controlling-downhill vehicle operation, in accordance with the present invention.

Referring now to FIG. 5, a flowchart is shown illustrating one preferred embodiment of a software algorithm 200 for controlling engine or vehicle speed to a target engine or vehicle speed during downhill vehicle operation, in accordance with another aspect of the present invention. Algorithm 200 is preferably stored within memory 15 and is executed by control computer 12, although the present invention contemplates that algorithm 200 may alternatively be stored elsewhere executed by an auxiliary computer, such as transmission control computer 50, as described hereinabove with respect to algorithm 100. In one important respect, algorithm 200 differs from algorithm 100 in that control computer 12 is operable in algorithm 200 to control current engine or vehicle speed to a target engine or vehicle speed while traversing a negative grade regardless of whether a potential runaway vehicle condition exists.

Algorithm 200 assumes that engine brake unit 42 is enabled for operation although not currently active to produce engine retarding torque. Algorithm 200 begins at step 202 and at step 204, control computer 12 is operable to determine a target engine or vehicle speed value TS in accordance with any of the techniques described hereinabove with respect to step 106 of algorithm 100. Thereafter at step 206, control computer 12 is operable to determine whether engine brake unit 42 has been activated to thereby produce engine retarding torque in an attempt to slow the engine or vehicle to the target speed TS. If not, algorithm 200 loops back to step 206. If, on the other hand, control computer 12 determines at step 206 that. engine brake unit 42 has been activated, algorithm execution continues at step 208 where control computer 12 is operable to determine a current engine or vehicle speed value CS in accordance with any of the techniques described hereinabove with respect to step 110 of algorithm 100. Thereafter at step 210, control computer 12 is operable to compute a speed error (ERR) as a difference between the current engine or vehicle speed value CS and the target speed value TS, and at step 212, control computer 12 is operable to compare ERR to an error threshold value TH. If ERR is less than or equal to TH at step 212, control computer is operable at step 214 to set a deceleration rate variable DR equal to a deceleration rate value DR2. If, however, ERR is greater than TH at step 212, control computer 12 is operable at step 216 to set the deceleration rate variable DR equal to a deceleration rate value DR1. Algorithm execution continues from steps 214 and 216 at step 218 where control computer 12 is operable to control engine brake unit 42, wastegate 34, service brakes 52 and/or automatic downshifting of transmission 16 to thereby decelerate from the current engine or vehicle speed CS to the target engine or vehicle speed value TS, preferably at a deceleration rate dictated by the value of DR. Thereafter at step 220, algorithm 200 is returned to its calling routing. Alternatively, step 218 may loop back to step 204 for continuous operation of algorithm 200.

From the foregoing, it should be apparent that control computer 12 is operable, under the direction of algorithm 200, to control engine/vehicle speed to a target engine or vehicle speed value TS during downhill vehicle operation and preferably at a desired deceleration rate. The control strategy of algorithm 200 is invoked by the detection of a target engine or vehicle speed TS followed by activation of engine brake unit 42. Control computer 12 is operable to interpret these two events as the setting of a target speed for traversal down a negative grade followed by a downhill vehicle condition which automatically triggers activation of the engine brake unit 42, pursuant to existing engine compression brake logic, to thereby slow the engine/vehicle to the target speed value TS. Thus, control computer 12 reaches step 208 only after it has determined that a target speed has been set for traversing a downhill grade and that the vehicle is currently traversing the downhill grade. Steps 202 and 204 accordingly represent only one preferred technique for making such a determination and the present invention contemplates other techniques for determining whether/when to invoke the engine/vehicle speed control strategies of the present invention. For example, control computer 12 may alternatively use any single one, or combination of, the one or more techniques described hereinabove with respect to step 102 of algorithm 100 in making a determination as to whether/when to invoke the engine/vehicle speed control strategies of the present invention. As a specific example, control computer may alternatively be operable at step 206 to monitor commanded fueling and/or engine/vehicle speed and advance to steps 208–218 only if/when commanded fueling is zero and/or engine/vehicle speed is increasing. Other known techniques for making a determination as to whether/when to advance to steps 208–218 of algorithm 200 will occur to those skilled in the art, and that such techniques fall within the scope of the present invention.

It should further be apparent from the foregoing description of algorithm 200 that control computer 12 is operable control engine/vehicle speed at a desired deceleration rate DR, wherein the value of DR depends upon a speed error difference between the current engine or vehicle speed CS and the target speed TS. Alternatively, control computer 12 may be operable at step 210 to determine a steepness or slope of the negative grade in accordance with any of the techniques described hereinabove, wherein control computer 12 is subsequently operable at steps 212–216 to determine a desired deceleration rate based on the steepness of the negative grade rather than on the speed error shown in step 210. In either case, DR1 is preferably greater than DR2 so that control computer 12 is operable to control deceleration to TS at a faster rate for steeper negative grades and at a slower rate for less steep negative grades. However, the present invention contemplates that DR1 may alternatively be less than or even equal to DR2. In any case, such a strategy is preferable since it removes any deceleration rate dependencies due to currently engaged gear ratio, vehicle weight, etc. However, it is to be understood that the present invention contemplates an embodiment of algorithm 200 wherein steps 210–216 are omitted, and control computer is operable after step 208 to control engine/vehicle speed to TS using any one or more of the techniques described hereinabove with respect to algorithm 100.

Finally, it should be apparent from step 218 that control computer 12 is preferably operable to adaptively control engine/vehicle speed, in accordance with techniques described hereinabove with respect to algorithm 100, to thereby provide for engine/vehicle speed control at a desired deceleration rate. Alternatively, control computer 12 may be operable at step 218 to control engine/vehicle speed in accordance with any one, or combination of, any of the engine/vehicle speed control techniques described with respect to algorithm 100.

In an alternative embodiment of algorithm 200, steps 210–218 are replaced by steps wherein control computer 12 is operable to compare the current speed CS, wherein CS is preferably engine speed, to a speed threshold. If the current engine speed is above the speed threshold, engine retarding force is incrementally increased using any one or more of the techniques described herein. If, however, the current engine speed is below the speed threshold, control computer 12 is operable to apply full engine retarding torque using any one or more of the techniques described herein. In either case, control computer 12 is preferably further operable to control automatic downshifting of transmission 16 as required in accordance with any one or more of the control strategies described hereinabove. In this embodiment, the deceleration rate of the vehicle is controlled indirectly as a function of the current engine retarding capacity of engine compression brake unit 42. For example, the engine torque retarding capacity of engine brake unit 42 is less efficient if engine speed is low (see FIG. 2), and an acceptable vehicle deceleration rate will accordingly be provided under low engine speed conditions, after steps 204 and 206 of algorithm 200 are satisfied, by applying the full engine retarding torque of engine compression brake unit 42. However, the engine retarding capacity of engine brake unit 42 is more efficient if engine speed is high, and an acceptable vehicle deceleration rate will accordingly be provided under high engine speed conditions, after steps 204 and 206 of algorithm 200 are satisfied, by incrementally increasing the engine retarding torque of engine compression brake unit 42. In any event, those skilled in the art will recognize that modifications to algorithm 200 to implement the foregoing concepts would be a mechanical step for a skilled computer programmer.

While the invention has been illustrated and described in detail in the foregoing drawings and description, the same is to be considered as illustrative and not restrictive in character, it being understood that only the preferred embodiments thereof have been shown and described and that all changes and modifications that come within the spirit of the invention are desired to be protected. For example, the present invention contemplates that control computer 12 may be configured to implement a subset of any one or more of the various control strategies described herein. As one specific example, in vehicle configurations having no engine compression brake unit 42, control computer 12 may be configured, according to any of the techniques described herein, to control only the service brakes 52 and automatic downshifting of transmission 16 to thereby control vehicle descent down a negative grade. As another specific example, control computer 12 may be configured, according to any of the techniques described herein, to control only engine compression brake unit 42, or engine compression brake unit 42 and wastegate 34, to thereby control vehicle descent down a negative grade. Other specific examples will occur to those skilled in the art, and such other specific examples are intended to fall within the scope of the present invention.

What is claimed is:

1. System for controlling downhill vehicle operation, comprising:

an engine compression brake associated with an internal combustion engine for retarding engine operation;

a service brake associated with a vehicle carrying said engine;

a transmission coupled to said engine and having a number of automatically selectable gear ratios;

means for determining one of a target engine and vehicle speed;

means for determining whether said vehicle is traversing a negative grade; and a control computer responsive to detection of said vehicle traversing a negative grade to control said engine compression brake, said service brake and selection of said number of automatically selectable gear ratios of said transmission to thereby control one of engine and vehicle speed to a corresponding one of said target engine speed and said target vehicle speed, said control computer activating said service brake only to an extent necessary to slow said vehicle sufficiently to allow an automatic downshift of said transmission.

2. The system of claim 1 further including means for determining a deceleration rate;

and wherein said control computer is operable to control any of said engine compression brake, said service brake and selection of said number of automatically selectable gear ratios of said transmission to thereby control one of engine and vehicle speed to a corresponding one of said target engine speed and said target vehicle speed at said deceleration rate.

3. The system of claim 2 wherein said means for determining a deceleration rate includes:

means for sensing one of engine and vehicle speed and producing a current speed signal corresponding thereto;

and wherein said control computer includes:

means for determining a speed error as a difference between said current speed signal and a corresponding one of said target engine speed and said target vehicle speed; and means for determining said deceleration rate as a first deceleration rate if said speed error is in excess of a predefined threshold and as a second deceleration rate is said speed error is below said predefined threshold.

4. The system of claim 1 further including:

a turbocharger; and a wastegate valve operable to control turbocharger boost pressure;

and wherein said control computer is further responsive to detection of said vehicle traversing a negative grade to control said wastegate valve to thereby control said one of engine and vehicle speed to said corresponding one of said target engine speed and said target vehicle speed.

5. The system of claim 4 further including means for determining a deceleration rate;

and wherein said control computer is operable to control any of said engine compression brake, said wastegate valve, said service brake and selection of said number of automatically selectable gear ratios of said transmission to thereby control one of engine and vehicle speed to a corresponding one of said target engine speed and said target vehicle speed at said deceleration rate.

6. The system of claim 5 wherein said means for determining a deceleration rate includes:

means for sensing one of engine and vehicle speed and producing a current speed signal corresponding thereto;

and wherein said control computer includes:

means for determining a speed error as a difference between said current speed signal and a corresponding one of said target engine speed and said target vehicle speed; and means for determining said deceleration rate as a first deceleration rate if said speed error is in excess of a predefined threshold and as a second deceleration rate is said speed error is below said predefined threshold.

7. The system of claim 1 wherein said control computer is associated with said transmission and is operable to control and manage overall operation of said transmission; and further including:

an engine computer operable to control and manage overall operation of said internal combustion engine; and means for transferring data between said control computer and said engine computer.

8. The system of claim 1 further including means for determining one of engine speed and vehicle speed;

and wherein said control computer includes means responsive to said one of engine speed and vehicle speed for computing said one of a target engine speed and a target vehicle speed as a learned one of said engine speed and vehicle speed over a recent interval of one of time and distance traveled.

9. The system of claim 1 further including a cruise control system having means for establishing a first set vehicle speed;

and wherein said control computer is operable to equate said one of a target engine speed and a target vehicle speed with a corresponding one of an engine speed associated with said first set vehicle speed.

10. The system of claim 9 further including means for establishing a second set vehicle speed;

and wherein said control computer is operable to disregard said first set vehicle speed and equate said one of a target engine speed and a target vehicle speed with a corresponding one of an engine speed associated with said second set vehicle speed.

11. The system of claim 11 wherein said means for establishing a second set vehicle speed includes a cruise control system having means for establishing said second set vehicle speed.

12. The system of claim 10 wherein said means for establishing a second set vehicle speed includes an operator interface system in communication with said control computer, said operator interface system including means for selecting said second set vehicle speed.

13. The system of claim 10 wherein said means for establishing a second set vehicle speed includes:

a global positioning system (GPS) operable to determine GPS coordinates of said vehicle;

means for determining a vehicle location from said GPS coordinates; and means for determining said second set vehicle speed from said vehicle location.

14. The system of claim 1 wherein said control computer is further operable to control and manage overall operation of said internal combustion engine.

15. A method of controlling downhill operation of a vehicle carrying an internal combustion engine having an engine brake and coupled to a transmission having a number of automatically selectable gear ratios, comprising the steps of:

determining whether the vehicle is traversing a negative grade;

determining one of a target engine speed and a target vehicle speed;

performing the following steps if the vehicle is traversing a negative grade;

determining one of a current engine and vehicle speed; and controlling any of an engine brake associated with said engine, a service brake associated with said vehicle and selection of said number of automatically selectable gear ratios of said transmission to thereby control said one of current engine and vehicle speed to a corresponding one of said target engine speed and said target vehicle speed, said control computer activating said service brake only to an extent necessary to slow said vehicle sufficiently to allow an automatic downshift of said transmission.

* * * * *

UNITED STATES PATENT AND TRADEMARK OFFICE
CERTIFICATE OF CORRECTION

PATENT NO.   : 6,349,253 B1
DATED        : February 19, 2002
INVENTOR(S)  : Steven M. Bellinger It is certified that error appears in the above-identified patent and that said Letters Patent is hereby corrected as shown below:

Column 6,
Line 51, please delete "INS" and insert -- IN5 --.

Column 11,
Line 29, please delete "1oo" and insert -- 100 --.

Column 13,
Line 15, please delete "1oo" and insert -- 100 --.

Column 14,
Line 66, please delete "1oo" and insert -- 100 --.

Signed and Sealed this

Fourth Day of June, 2002

Attest:

Attesting Officer

JAMES E. ROGAN
*Director of the United States Patent and Trademark Office*